United States Patent
Li (10) Patent No.: US 9,009,373 B2
(45) Date of Patent: Apr. 14, 2015

(54) METHOD FOR IMPLEMENTING AUDIO TRANSMISSION AND MOBILE TERMINAL

(75) Inventor: Xingyuan Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 94 days.

(21) Appl. No.: 13/576,193

(22) PCT Filed: Oct. 27, 2010

(86) PCT No.: PCT/CN2010/078170
§ 371 (c)(1),
(2), (4) Date: Jul. 31, 2012

(87) PCT Pub. No.: WO2011/157026
PCT Pub. Date: Dec. 22, 2011

(65) Prior Publication Data
US 2012/0303846 A1 Nov. 29, 2012

(30) Foreign Application Priority Data

Jun. 13, 2010 (CN) .......................... 2010 1 0207588

(51) Int. Cl.
| | | |
|---|---|---|
| G06F 13/18 | (2006.01) | |
| G06F 13/16 | (2006.01) | |
| G06F 13/36 | (2006.01) | |
| G06F 13/42 | (2006.01) | |
| G06F 17/30 | (2006.01) | |
| G06F 3/16 | (2006.01) | |
| G06F 13/10 | (2006.01) | |

(52) U.S. Cl.
CPC ................ *G06F 3/162* (2013.01); *G06F 13/36* (2013.01); *G06F 13/1605* (2013.01); *G06F 13/4282* (2013.01); *G06F 17/30743* (2013.01); *G06F 13/18* (2013.01); *G06F 13/102* (2013.01); *G06F 2213/0042* (2013.01)

(58) Field of Classification Search
None
See application file for complete search history.

(56) References Cited

U.S. PATENT DOCUMENTS 6,801,959 B1 * 10/2004 Crutchfield et al. ............ 710/30
2006/0136666 A1 * 6/2006 Pang et al. ..................... 711/114
(Continued)

FOREIGN PATENT DOCUMENTS

| CN | 101150655 A | 3/2008 |
|---|---|---|
| JP | 2007249938 A | 9/2007 |

OTHER PUBLICATIONS

Universal Serial Bus Device Class Definition for Audio Devices, Release 1.0; Mar. 18, 1998; pp. 36-39; http://www.usb.org/developers/devclass_docs/audio10.pdf.*
(Continued)

*Primary Examiner* — Kris Rhu
(74) *Attorney, Agent, or Firm* — Oppedahl Patent Law Firm LLC (57) ABSTRACT

The disclosure discloses a method for implementing audio transmission and a mobile terminal, wherein the method includes: setting an interface descriptor for a Universal Serial Bus (USB) audio device in a USB composite device, wherein the interface descriptor is used for describing information needed by the USB audio device for transmitting audio data; sending the interface descriptor of the USB audio device to a USB host by the USB audio device to enable the USB host to complete enumeration and identification of the USB audio device according to the interface descriptor of the USB audio device; and performing audio data transmission by the USB audio device with the USB host. By means of the disclosure, a high-quality audio transmission effect can be ensured.

12 Claims, 5 Drawing Sheets

(56) References Cited

U.S. PATENT DOCUMENTS

| | | | |
|---|---|---|---|
| 2008/0071936 A1* | 3/2008 | Sugaya | 710/12 |
| 2009/0031073 A1* | 1/2009 | Diggs et al. | 711/103 |
| 2009/0172095 A1* | 7/2009 | Moore et al. | 709/204 |
| 2009/0222814 A1* | 9/2009 | Astrand | 718/1 |
| 2010/0023649 A1 | 1/2010 | Choi et al. | |
| 2012/0059496 A1* | 3/2012 | Gong et al. | 700/94 |

OTHER PUBLICATIONS

International Search Report in international application No. PCT/CN2010/078170, mailed on Mar. 24, 2011.

English Translation of the Written Opinion of the International Search Authority in international application No. PCT/CN2010/078170, mailed on Mar. 24, 2011.

Embedded phone design based on USB_Class_Audio. Nov. 15, 2009.

Design and Implementation of USB Audio Device Aug. 31, 2007.

"Universal Serial Bus Device Class Definition for Audio Devices. Release 2.0", Internet Citation, May 31, 2006, XP007903835, Retrieved from the Internet: URL: http://www.usb.org/developers/devclass_docs/ Audio2.0_final.zip [retrieved on Jan. 15, 2008]. (144 pages—see Supplementary European Search Report in European application No. 10853134.4 for relevant pages).

Supplementary European Search Report in European application No. 10853134.4, mailed on May 28, 2014. (6 pages—see entire document).

* cited by examiner

METHOD FOR IMPLEMENTING AUDIO TRANSMISSION AND MOBILE TERMINAL

TECHNICAL FIELD

The disclosure relates to an audio transmission technology, and in particular to a method for implementing audio transmission and a mobile terminal.

BACKGROUND

With the rapid development of a wireless communication technology and the gradual popularization of a third generation wireless communication network technology, functions provided by a mobile terminal are more and more diverse. The mobile terminal generally implements a functional interface by a Universal Serial Bus (USB) composite device. The so-called USB composite device refers to a USB device in which a USB master device is provided with multiple sub-devices, and each sub-device communicates with a USB host side by multiple USB endpoints. Generally, these USB devices include: an Attention (AT) port for transmitting an AT command, a modem port for providing a data service function, and a sound port for transmitting audio data. If the mobile terminal has a storage function, the mobile terminal further is provided with a USB large-capacity storage device. Wherein, the USB host is generally a Personal Computer (PC) side device provided with a USB host controller.

The conventional sound port for audio transmission transmits data by bulk endpoints of the USB, the USB host controller will not reserve a transmission bandwidth for the bulk endpoints, and when the USB has a very heavy load, a data transmission real-time property of the sound port will be influenced to cause audio delay, worse tone quality, more noise and the like. In addition, due to a limited processing capability of a Central Processing Unit (CPU) of a mobile terminal, when large amounts of data are transmitted on the USB, a audio data transmission request from the USB host side will not be responded in time due to the exhausted internal bus bandwidth of the CPU, so that loss of the audio data is caused and thus the tone quality becomes worse.

Furthermore, the method for transmitting audio data by the sound port in the prior art is actually a method self-defined by a manufacturer and does not meet any USB standard, so that a mobile terminal is difficult to transplant an application in different operating systems and application scenarios.

SUMMARY

In view of the problem that the tone quality of the audio becomes worse due to the existing insufficient Universal Serial Bus (USB) bandwidth in the prior art, the disclosure is provided, so that the main purpose of the disclosure is to provide a method for implementing audio transmission and a mobile terminal.

The method for implementing the audio transmission according to one embodiment of the disclosure includes that: an interface descriptor is set for a USB audio device in a USB composite device, wherein the interface descriptor is used for describing information needed by the USB audio device for transmitting audio data; the USB audio device sends the interface descriptor of the USB audio device to a USB host to enable the USB host to complete enumeration and identification of the USB audio device according to the interface descriptor of the USB audio device; and the USB audio device performs audio data transmission with the USB host.

Wherein, the interface descriptor of the USB audio device may further include: an audio control interface descriptor, an uplink audio data stream interface descriptor, and a downlink audio data stream interface descriptor.

Wherein, the USB composite device may include: a USB audio device and a non-USB audio device; and that the USB audio device performs audio data transmission with the USB host may further include that: the USB composite device preferentially processes a data transmission request from the USB audio device, and after completely processing the data transmission request from the USB audio device, the USB composite device processes a data transmission request from the non-USB audio device.

Furthermore, that the USB composite device processes a data transmission request from the non-USB audio device may further include: when data which the non-USB audio device requests to transmit exceeds a threshold, the USB composite device splits the data requested to be transmitted into multiple data packets for processing.

Furthermore, the non-USB audio device may include at least one of an AT port, a Modem port and a storage device.

A mobile terminal according to one embodiment of the disclosure includes: a USB composite device, wherein the USB composite device further includes a USB audio device and a non-USB audio device; the mobile terminal further includes: an interface descriptor setting module, configured to set an interface descriptor of the USB audio device, wherein the interface descriptor is configured to describe information needed by the USB audio device for transmitting audio data; and a sending module, configured to send the interface descriptor to a USB host to enable the USB host to complete enumeration and identification of the USB audio device according to the interface descriptor.

The interface descriptor of the USB audio device may further include: an audio control interface descriptor, an uplink audio data stream interface descriptor, and a downlink audio data stream interface descriptor.

The mobile terminal may further include: a priority setting module, configured to set a data transmission endpoint of the USB audio device as a high-priority endpoint to enable the USB host to preferentially process a data transmission request from the USB audio device.

Furthermore, the mobile terminal may further include: a splitting module, configured to split data which the non-USB audio device requests to transmit exceeds a threshold into multiple data packets.

Furthermore, the non-USB audio device may include at least one of an AT port, a Modem port and a storage device.

Compared with the prior art, according to the technical solution above of the disclosure, a high-quality audio transmission effect can be ensured in the case of an insufficient USB bandwidth, or a heavy processing task of the mobile terminal, or an insufficient internal bus bandwidth and hardware resource.

DETAILED DESCRIPTION

In order to make the purpose, technical solution and advantages of the disclosure more clear, the disclosure will be further described in detail with reference to the drawings and embodiments hereinafter.

A descriptor is a complete data structure which is used for describing all properties of a USB device; a USB host requires the USB device to send these information by a series of commands so that the USB host acquires a function, class, occupied bandwidth, transmission mode and size of data volume of the USB device; and only after the USB host determines these information can the USB device start to work.

According to one embodiment of the disclosure, a method for implementing audio transmission is provided.

Figure 1:
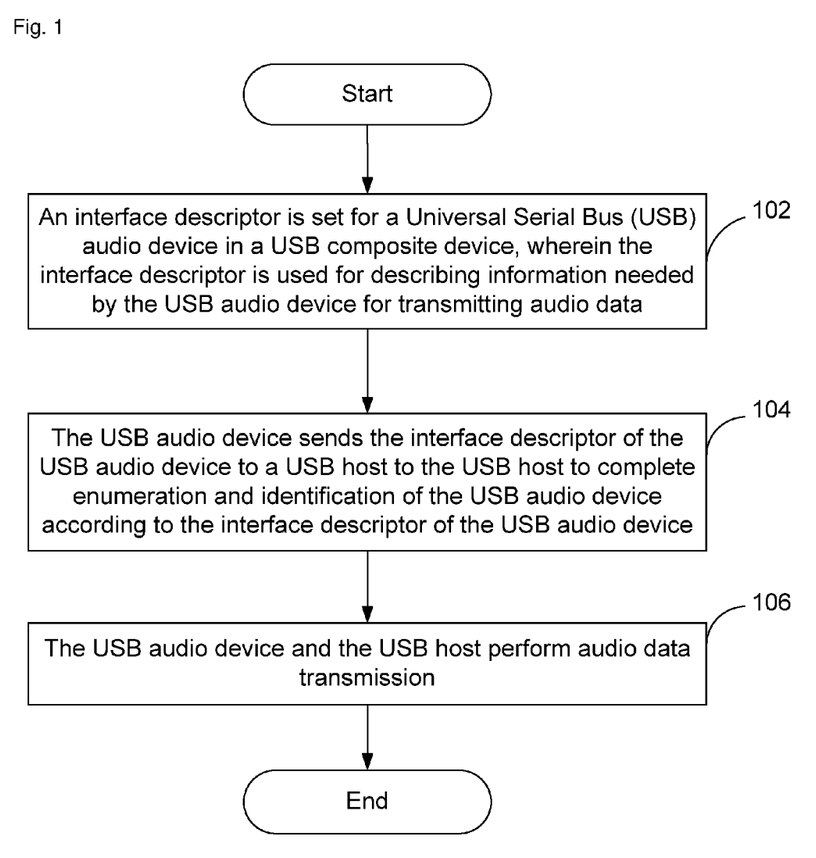
FIG. 1 is a flowchart of a method for implementing audio transmission according to one embodiment of the disclosure.

FIG. 1 is a flowchart of a method for implementing audio transmission according to one embodiment of the disclosure, as shown in FIG. 1, the method includes Step 102 to Step 106.

Step 102: an interface descriptor is set for a USB audio device in a USB composite device, wherein the interface descriptor is used for describing information needed by the USB audio device for transmitting audio data.

Step 104: the USB audio device sends the interface descriptor of the USB audio device to a USB host to the USB host to complete enumeration and identification of the USB audio device according to the interface descriptor of the USB audio device.

Step 106: the USB audio device and the USB host perform audio data transmission.

The details of the above processing will be described in detail hereinafter.

In the step 102:

a standard USB device has following USB descriptors: a device descriptor, a configuration descriptor, a character string descriptor, an interface descriptor, and an endpoint descriptor.

Multiple sub-devices including a USB audio device for transmitting audio data and a non-USB audio device exist under the configuration descriptor of the USB composite device, wherein the non-USB audio device can include: an AT port for transmitting an AT command, and a Modem port for providing a data service function; and if a mobile terminal has a storage function, it further is provided with a USB large-capacity storage device (or referred to as storage device). Each sub-device is represented by one or more USB interface descriptors. Each device respectively communicates with a USB host side by multiple USB endpoints.

Figure 2:
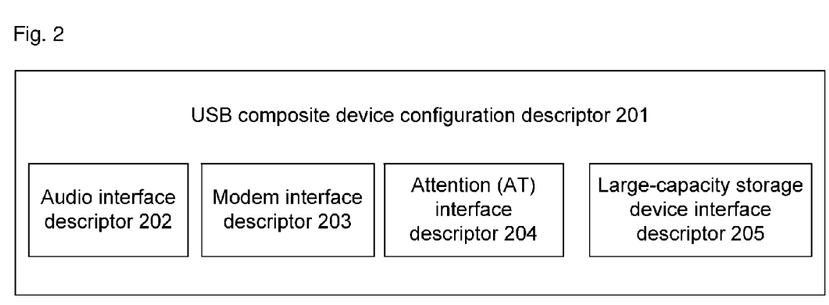
FIG. 2 is a schematic diagram of a configuration descriptor of a USB composite device according to one embodiment of the disclosure.

FIG. 2 is a schematic diagram of a configuration descriptor of a USB composite device according to one embodiment of the disclosure; a configuration descriptor 201 of the USB composite device is a configuration descriptor of a USB device of a mobile is terminal; and with reference to FIG. 2, the configuration descriptor 201 of the USB composite device includes: an Audio device interface descriptor 202, a Modem interface descriptor 203, an AT interface descriptor 204, a large-capacity storage device interface descriptor 205 and the like.

A USB Audio device exists as a sub-device of the USB composite device, and the device descriptor of the USB audio device consists of three USB interface descriptors, which specifically includes:

1, an Audio control interface descriptor, which is used for signifying that the USB device belongs to the USB Audio device, and indicating the next two interface descriptors belong to the same USB Audio device therewith;

2, an Audio uplink audio data stream interface descriptor, which describes a audio data format from the mobile terminal to the USB host, and includes an Audio stream endpoint descriptor for describing a USB ISO (synchronous) transmission endpoint needed for transmitting uplink audio stream data; and 3, an Audio downlink audio data stream interface descriptor, which describes a audio data format from the USB host to the mobile terminal, and includes an Audio stream endpoint descriptor for describing the USB ISO transmission endpoint needed for transmitting downlink audio stream data.

Figure 3:
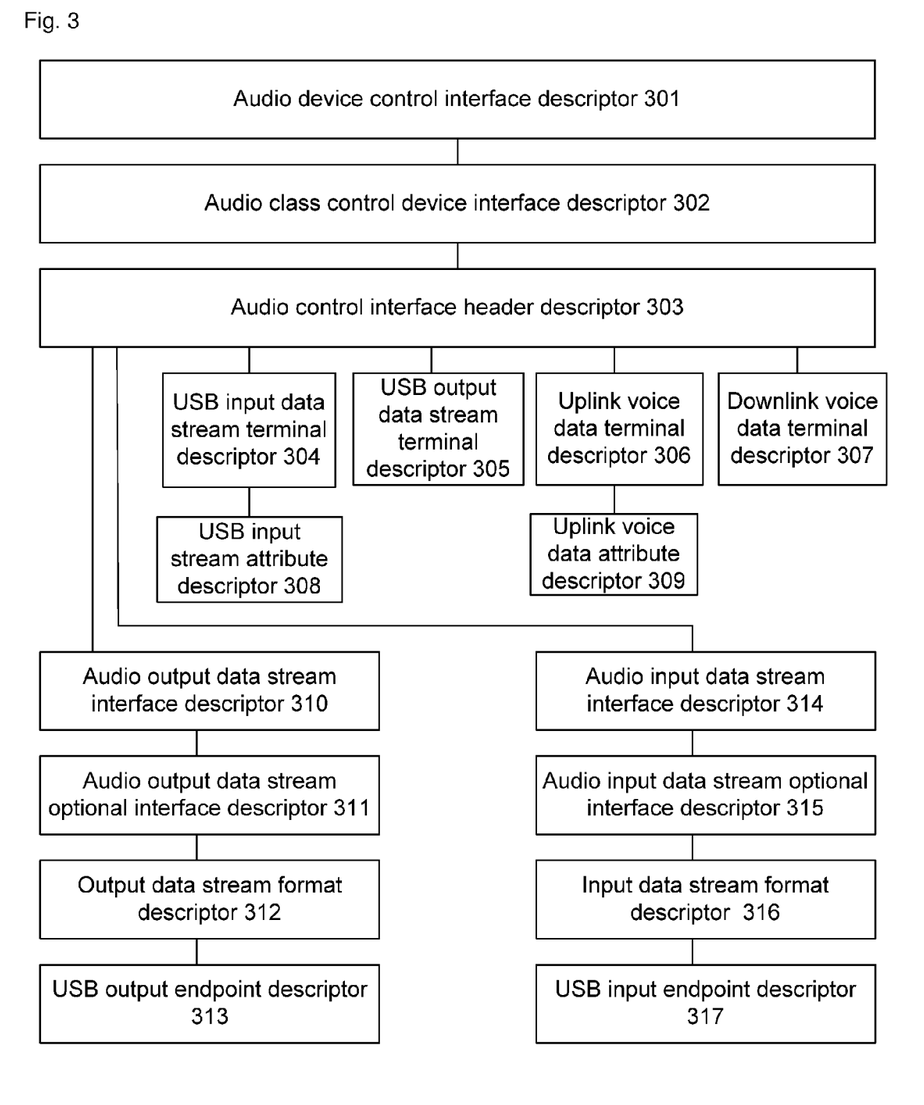
FIG. 3 is a schematic diagram showing a structure of an interface descriptor of a USB audio transmission device according to one embodiment of the disclosure.

The specific composition of the three interface descriptors of the USB Audio device refers to FIG. 3. FIG. 3 is a schematic diagram showing a structure of an interface descriptor of a USB audio transmission device according to the disclosure. As shown in FIG. 3:

an Audio device control interface descriptor 301 is an entry of the whole USB Audio device descriptor and describes a USB device class used by the USB device;

an Audio class device interface descriptor 302 indicates that all descriptors after the descriptor are the USB Audio class related descriptors;

an Audio control interface header descriptor 303 indicates a relationship between all following descriptors and the whole USB device descriptor;

a USB input data stream terminal descriptor 304 is used for representing an audio data stream from the USB host to the USB device;

a USB input stream property descriptor 308 is used for describing an attribute of a USB input data stream;

a USB output data stream terminal descriptor 305 is used for representing the audio data stream from the USB device to the USB host;

an uplink audio data terminal descriptor 306 is used for representing an audio data stream from the USB device to a wireless network protocol stack;

an uplink audio data property descriptor 309 is used for describing an attribute of the uplink audio data stream;

a downlink audio data terminal descriptor 307 is used for representing an audio data stream from the wireless network protocol stack to the USB device;

an audio output data stream interface descriptor 310 is used for representing an audio output stream stopping state interface; after the USB host stops sending audio data, the USB host sends an setting interface "Set Interface" command to select the interface;

an audio output data stream optional interface descriptor 311 is used for representing an audio output stream transmission state interface; when the USB host starts to send audio data, the USB host sends the Set Interface command to select the interface;

an output data stream format descriptor 312 is used for describing a parameter of the audio data stream which can be received by the device, including sampling precision, sampling frequency and audio format;

a USB output endpoint descriptor 313 is used for describing an endpoint number and an endpoint attribute of an ISO terminal which is used by an Audio device for receiving audio data;

an audio input data stream interface descriptor 314 is used for representing an audio input stream stopping state interface; after the USB host stops receiving audio data, the USB host sends the Set Interface command to select the interface;

an audio input data stream optional interface descriptor 315 is used for representing an audio input stream transmission state interface; when the USB host starts to receive audio data, the USB host sends the Set Interface command to select the interface;

an input data stream format descriptor 316 is used for describing a parameter of an audio data stream sent by the device, including sampling precision, sampling frequency and audio format; and a USB input endpoint descriptor 317 is used for describing an endpoint number and an endpoint attribute of an ISO terminal which is used by the audio device for sending audio data.

Figure 4:
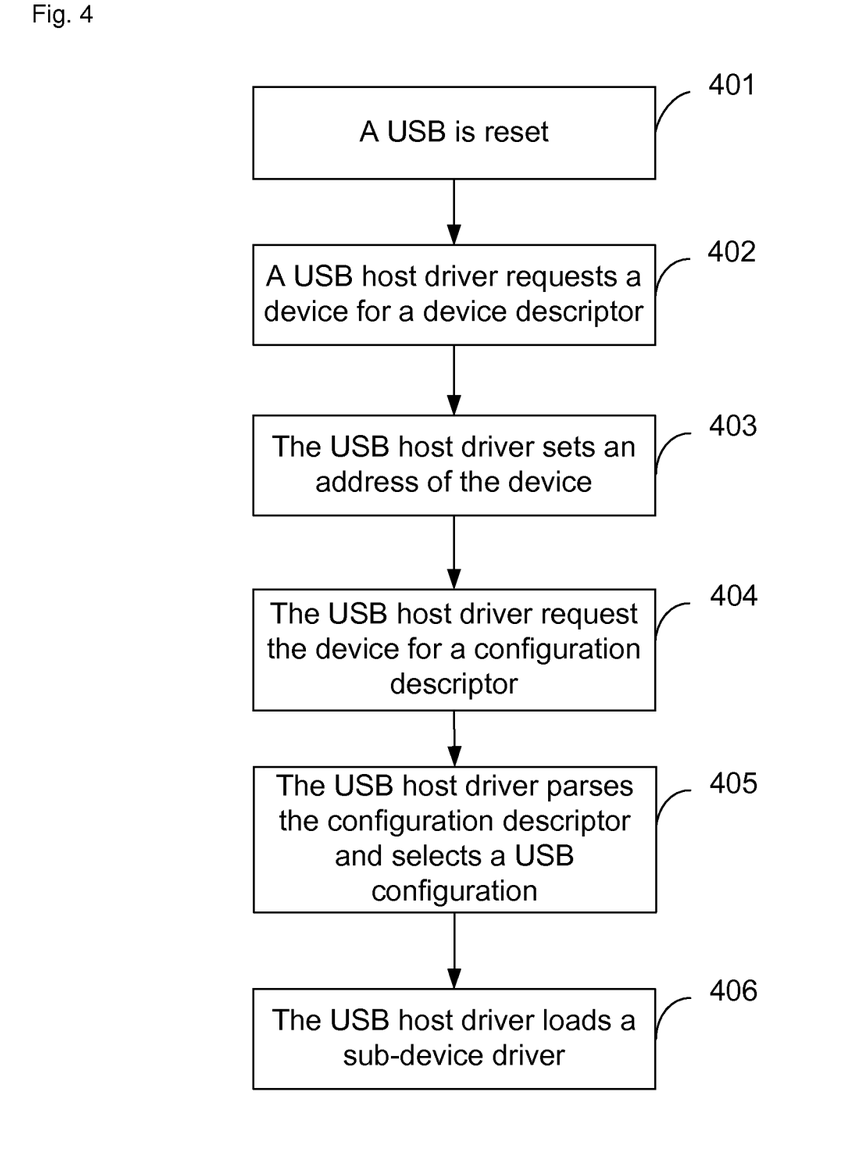
FIG. 4 is a flowchart showing an enumerating process of a USB audio transmission device according to one embodiment of the disclosure.

In the step 104:

FIG. 4 is a flowchart showing an enumerating process of a USB audio transmission device according to one embodiment of the disclosure; and in the process, the USB descriptors shown in FIG. 2 and FIG. 3 are sent to the USB host to complete an enumeration and identification process of the device. FIG. 4 includes the following steps.

Step 401: a USB is reset. The USB is reset in order that a device address of the USB device is restored to a default address to prepare to receive an enumerating command from a USB host driver.

Step 402: the USB host driver requests the device for a device descriptor. In the step, the USB device returns the device descriptor of the USB device to the USB host.

Step 403: the USB host driver sets an address of the device. In the step, the USB host sends a command of setting the address to the device. After receiving the command, the USB device fills the received address to an address register of a USB device controller. Thereafter, the transmission of all USB data is completed at the address.

Step 404: the USB host driver requests the device for a configuration descriptor. In the step, the USB host sends a command to the device to request the device for the configuration descriptor. The USB device needs to make the three interface descriptors of the USB audio device shown in FIG. 3 together with the interface descriptors of other sub-devices in the USB composite device including in the configuration descriptor of the USB composite device and return the configuration descriptor of the USB composite device to the USB host.

Step 405: the USB host driver parses the configuration descriptor and selects the USB configuration. After acquiring the configuration descriptor returned by the device, the USB host starts the flow of parsing the configuration descriptor. In the flow, the correctness of the configuration descriptor will be verified and the number and class of is the sub-device included in the configuration descriptor of the composite device will be parsed. When the configuration descriptor is correct, the USB host driver sends a command of selecting a configuration to the device to make the current configuration of the USB valid.

Step 406: the USB host driver loads a sub-device driver. The USB host respectively loads the driving program of each sub-device according to the information of USB sub-devices parsed in the step 405. The USB audio device of the disclosure will load the driving program of the USB audio device. At the moment, the enumeration and identification process of the USB device is completed, and the device enters into a ready state to wait for a command of starting data transmission.

In the step 106:

The step of responding to the Set Interface command sent by the USB host and starting or stopping the receiving or sending of the audio data stream specifically includes:

1. after the host sends an interface selecting command and selects a data transmission interface, the mobile terminal starts a Start of Frame (SOF) interruption of the USB;

2. when the SOF interruption occurs, a frame of audio data is sent and received at the ISO endpoint for data transmission; and 3. after the host sends the interface selecting command and selects a non-data transmission interface, the mobile terminal stops the SOF interruption of the USB. The receiving and sending of the audio data are stopped.

To sum up, since the bandwidth needed for transmitting the audio data through the USB ISO endpoint is reserved on the USB host side, the bandwidth of the USB can be ensured not to be exhausted by other sub-device in the composite device, so that the uplink data and downlink data of the audio can be normally transmitted even the USB is very busy.

In addition, in the driving program of the USB composite device of the mobile terminal, the data transmission endpoints used by each sub-device in the device are divided according to the priority: for the data transmission endpoints requiring a higher real-time property, the ISO endpoints for audio transmission are high-endpoints; and the endpoints used by the device requiring a low real-time properties, such as the AT port, Modem port, large-capacity storage device and the like, are low-priority endpoints.

When the transmission interruption of the USB occurs, the data transmission requests of the high-priority endpoints are processed preferentially; and the data transmission requests of other low-priority endpoints are not processed until the data transmission requests on the high-priority endpoints are completely processed.

Figure 5:
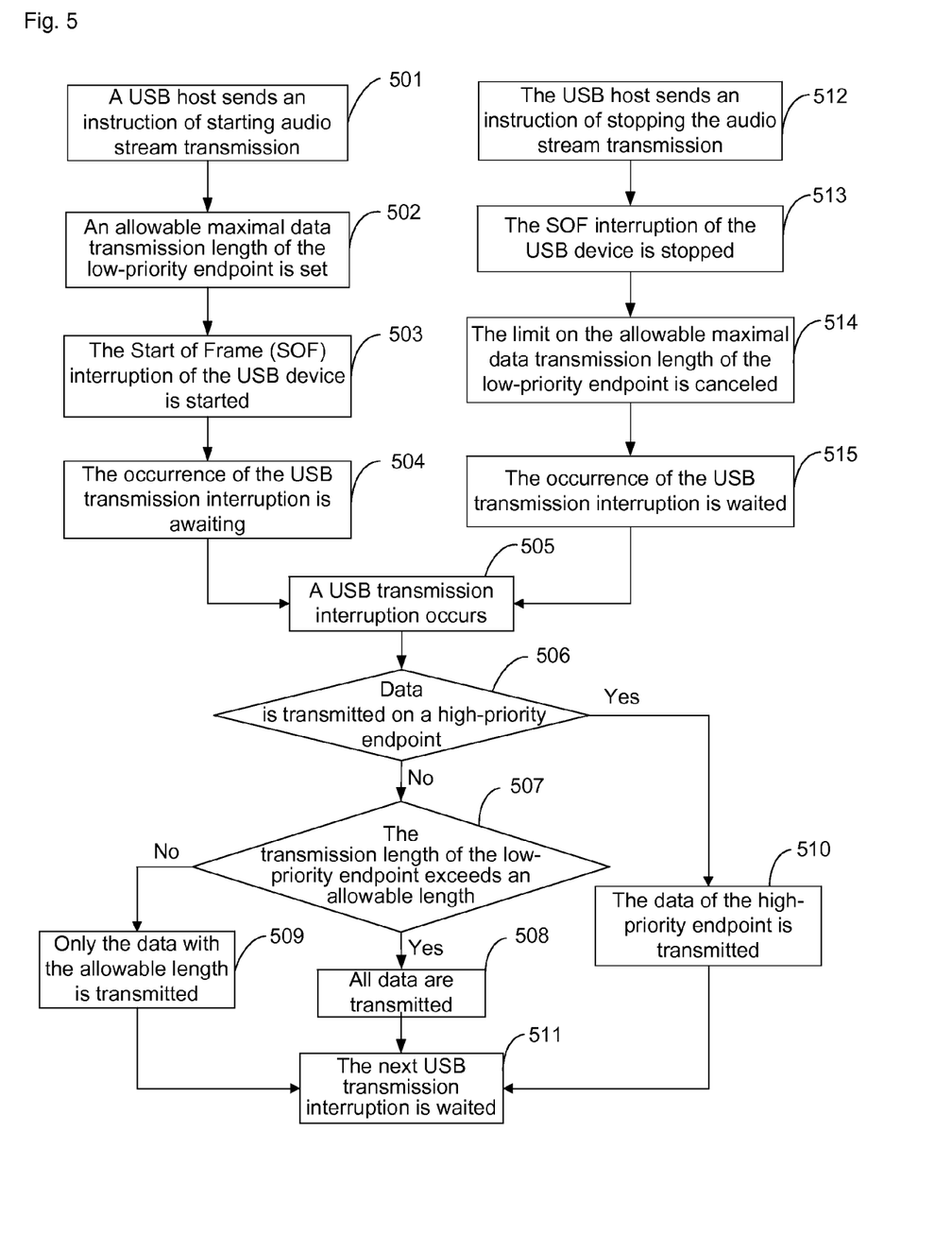
FIG. 5 is a flowchart showing that a USB driving program schedules data transmission according to a priority according to one embodiment of the disclosure.

Furthermore, when the data which the low-priority endpoint requires to transmit one time is overlong, the request is split into multiple small data packets. Specifically, with reference to FIG. 5, FIG. 5 is a flowchart showing that a USB driving program schedules data transmission according to a priority according to one embodiment of the disclosure, which includes:

Step 501: a USB host sends an instruction of starting audio stream transmission. The instruction here refers to the setting interface (Set Interface) command as described in FIG. 3. The USB host starts output data stream transmission and input data stream transmission respectively by selecting the Audio output data stream optional interface descriptor 311 or the Audio input data stream optional interface descriptor 315;

Step 502: an allowable maximal data transmission length of the low-priority endpoint is set; after the audio data stream transmission is started, in order to ensure the real-time property of the audio stream transmission, the allowable maximal data transmission length of the low-priority endpoint is set to assure that the audio data stream transmission request can be timely processed;

Step 503: the SOF interruption of the USB device is started; as the ISO data transmission is synchronous with a SOF of the USB, in order to start the transmission of the ISO data, the SOF interruption of the USB device controller needs to be started; the interruption occurs at the moment of the each SOF;

Step 504: the occurrence of the USB transmission interruption is awaiting;

Step 505: a transmission interruption occurs in a USB hardware controller. The interruption here includes the SOF interruption used for ISO transmission, the transmission interruption of other USB endpoint, and the interruption by produced a Direct Memory Access (DMA) controller;

Step 506: it is judged whether a data transmission request is transmitted on a high-priority endpoint according to the priority setting and data transmission state of each endpoint; if yes, the step 510 is executed; otherwise, the step 507 is executed;

Step 507: it is judged whether the length of the data which is requested to transmit on the current low-priority endpoint exceeds the allowable maximal data length; if the allowable maximal data transmission length is set at present and the length of the data requested to transmit has exceeded the allowable value, step 509 is executed; otherwise, step 508 is executed;

Step 508: data is transmitted according to the length of the data requested by the low-priority endpoint;

Step 509: only the data with an allowable length (less than a preset allowable value) is transmitted on the low-priority endpoint;

Step 510: requested data with any length is transmitted on the high-priority endpoint;

Step 511: the transmission is ended to wait for the next USB transmission interruption;

Step 512: the USB host sends an instruction of stopping audio stream transmission. The instruction here refers to the setting interface (Set Interface) command as described in FIG. 3; the USB host stops the output data stream transmission and input data stream transmission respectively by selecting the Audio output data stream interface descriptor 310 or the Audio input data stream interface descriptor 314; if and only if after the input stream and the output stream are completely stopped, the transmission of the USB audio stream can be completely stopped and step 513 be executed;

Step 513: the SOF interruption is stopped; after the SOF interruption is stopped, the hardware of the USB device controller will not generate an interruption at the moment of the SOF, and the ISO transmission is stopped;

Step 514: the limit on the allowable maximal data transmission length of the low-priority endpoint is cancelled; the data stream transmissions on all the high-priority endpoints have been stopped, so the limit on the allowable maximal data transmission length of the low-priority endpoint is cancelled to improve the data transmission efficiency of the high-priority endpoint; and Step 515: the occurrence of the USB transmission interruption is awaiting to perform the next USB transmission.

By the above processing, the data of the high-priority endpoint can be sent preferentially, and the time of occupying the internal transmission resource of the mobile terminal by the low-priority endpoint is limited, so that the data transmission request of the high-priority endpoint can be quickly responded.

The USB audio transmission interface device implemented by the steps provided in the disclosure meets the USB Audio Cass device standard of the USB-IF; in addition, the USB audio transmission interface device implemented by the disclosure has native drive programs of these operating systems on the Windows, Linux and MAC OS operating systems, and serves as a sound card device on the above operating systems, and the audio data transmitted from the device can be accessed by an Application programme Interface (API) provided by the operating systems.

According to one embodiment of the disclosure, a mobile terminal is further provided.

The mobile terminal implements a functional interface by a USB composite device, wherein the USB composite device further includes a USB audio device and a non-USB audio device, wherein the non-USB audio device at least includes one of an AT port, a Modem port, and a storage device (or called large-capacity storage device).

Figure 6:
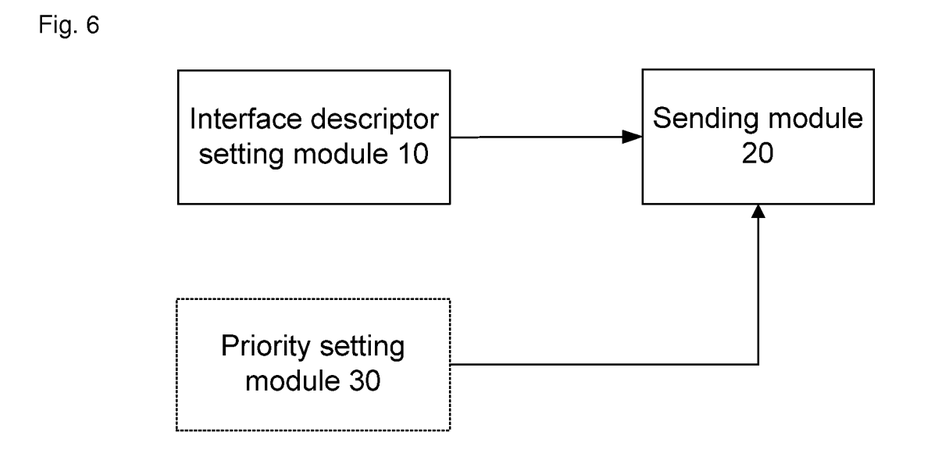
FIG. 6 is a block diagram showing a structure of a mobile terminal according to one embodiment of the disclosure.

FIG. 6 is a block diagram showing a structure of a mobile terminal according to one embodiment of the disclosure, as shown in FIG. 6, the mobile terminal further includes: an interface descriptor setting module 10 and a sending module 20.

The interface descriptor setting module 10 is configured to set an interface descriptor of the USB audio device, wherein the interface descriptor is configured to describe information needed by the USB audio device for transmitting audio data. The interface descriptor of the USB audio device further includes: an audio control interface descriptor, an uplink audio data stream interface descriptor, and a downlink audio data stream interface descriptor.

The sending module 20 is configured to send the interface descriptor set by the interface descriptor setting module 10 to a USB host to enable the USB host to complete enumeration and identification of the USB audio device according to the interface descriptor.

In this way, by means of the abovementioned structure, a high-quality audio transmission effect can be ensured in the case of the insufficient USB bandwidth.

With reference to FIG. 6, the mobile terminal further includes: a priority setting module 30, which is configured to set a data transmission endpoint of the USB audio device as a high-priority endpoint and set a data transmission endpoint of the non-USB audio device as a low-priority endpoint. When a USB transmission interruption occurs, the USB host preferentially processes a data transmission request from the USB audio device, and after completely processing the data from the USB audio device, processes a data request of other low-priority endpoint.

In addition, the mobile terminal further includes: a splitting module (not shown in figure), which is configured to split data which the non-USB audio device requests to transmit exceeds a threshold into multiple data packets. The non-USB audio device is the low-priority endpoint; and when the data that the non-USB audio device requires to transmit one time is overlong (the length of the data exceeds a preset threshold), the data required to be transmitted is split into multiple small data packets for transmission.

In a specific application, the above mobile terminal includes but is not limited to: a wireless data card, a wireless data module built into a laptop computer, a Machine To Machine (M2M) module applied to an industry scene, and other device.

To sum up, compared with the prior art, the USB audio data transmission implemented by the disclosure has the following effects that:

(1) a high-quality audio transmission effect is ensured under the condition of an insufficient USB bandwidth;

(2) the high-quality audio transmission effect is ensured under the condition of a heavy processing task of the mobile terminal or an insufficient internal bus bandwidth or hardware resource; and (3) the audio function of the mobile terminal can be quickly and conveniently transplanted to different operating systems and application scenes, and the disclosure is very suitable for a fast response request of an industry application in a complex application scene.

The above are only embodiments of the disclosure and are not intended for limiting the disclosure. For those skilled in the art, the disclosure may have various modifications and changes. Any modification, equivalent replacement, improvement and the like made within the spirit and principle of the disclosure shall fall within the scope of protection of the disclosure.

The invention claimed is:

1. A method for implementing audio transmission, comprising:
setting an interface descriptor for a Universal Serial Bus (USB) audio device in a USB composite device, wherein the interface descriptor is used for describing information needed by the USB audio device for transmitting audio data;
sending, by the USB audio device, the interface descriptor of the USB audio device to a USB host to enable the USB host to complete enumeration and identification of the USB audio device according to the interface descriptor of the USB audio device; and
performing audio data transmission between the USB host and the USB audio device, wherein
after the USB host sends an interface selecting command and selects a data transmission interface, the USB audio device starts a Start of Frame (SOF) interruption of the USB;
when the SOF interruption occurs, a frame of audio data is sent and received at the isochronous (ISO) endpoint for data transmission;
after the USB host sends the interface selecting command and selects a non-data transmission interface, the USB audio device stops the SOF interruption of the USB;
wherein a bandwidth needed for transmitting the audio data through the USB ISO endpoint is reserved on the USB host side;
wherein the enumeration and identification of the USB audio device according to the interface descriptor of the USB audio device comprising:
the USB resets in order that a device address of the USB device is restored to a default address;
the USB host driver requests the device for a device descriptor, and the USB device returns the device descriptor of the USB device to the USB host;
the USB host driver sets an address of the device, the USB host sends a command of setting the address to the device, after receiving the command, the USB device fills the received address to an address register of a USB device controller;
the USB host driver requests the device for a configuration descriptor, the USB host sends a command to the device to request the device for the configuration descriptor, and the USB device returns the configuration descriptor of the USB composite device, including the interface descriptors of the USB audio device and the interface descriptors of other sub-devices in the USB composite device, to the USB host;
the USB host driver parses the configuration descriptor and selects the USB configuration; and
the USB host driver loads a sub-device driver, the USB host respectively loads the driving program of each sub-device according to the parsed information of USB sub-devices,
wherein the performing audio data transmission between the USB host and the USB audio device further comprises:
preferentially processing a data transmission request from the USB audio device by the USB composite device; and
after the data transmission request from the USB audio device is completely processed, processing a data transmission request from the non-USB audio device by the USB composite device,
wherein setting the ISO endpoints for audio transmission requiring a higher real-time property as high-endpoints; and setting the AT port, Modem port, and large-capacity storage device requiring a low real-time properties as low-priority endpoints, when the transmission interruption of the USB occurs, the data transmission requests of the high-priority endpoints are processed preferentially; and the data transmission requests of other low-priority endpoints are not processed until the data transmission requests on the high-priority endpoints are completely processed,
setting an allowable maximal data transmission length of the low-priority endpoint, only the data with a length less than the allowable maximal data transmission length is transmitted on the low-priority endpoint, when the data which the low-priority endpoint requires to transmit with a length longer than the allowable maximal data transmission length, the request is split into multiple small data packets,
cancelling the limitation on the allowable maximal data transmission length of the low-priority endpoint, when data transmissions on all the high-priority endpoints have been stopped.

2. The method according to claim 1, wherein the interface descriptor of the USB audio device further comprises:
an audio control interface descriptor, an uplink audio data stream interface descriptor, and a downlink audio data stream interface descriptor.

3. The method according to claim 1, wherein the USB composite device comprises: a USB audio device and a non-USB audio device.

4. The method according to claim 3, wherein the processing a data transmission request from the non-USB audio device by the USB composite device further comprises:
when data which the non-USB audio device requests to transmit exceeds a threshold, splitting the data requested to be transmitted into multiple data packets for processing by the USB composite device.

5. The method according to claim 3, wherein the non-USB audio device comprises at least one of an AT port, a Modem port and a storage device;
wherein the non-USB audio device is any USB sub-device other than a USB audio device.

6. The method according to claim 4, wherein the non-USB audio device comprises at least one of an AT port, a Modem port and a storage device;
wherein the non-USB audio device is any USB sub-device other than a USB audio device.

7. A mobile terminal, comprising a Universal Serial Bus (USB) composite device, wherein the USB composite device further comprises a USB audio device and a non-USB audio device; the mobile terminal further comprising:
an interface descriptor setting module, configured to set an interface descriptor of the USB audio device, wherein the interface descriptor is configured to describe information needed by the USB audio device for transmitting audio data; and
a sending module, configured to send the interface descriptor to a USB host to enable the USB host completes enumeration and identification of the USB audio device according to the interface descriptor, wherein
after the USB host sends an interface selecting command and selects a data transmission interface, the USB audio device starts a Start of Frame (SOF) interruption of the USB;

when the SOF interruption occurs, a frame of audio data is sent and received at the isochronous (ISO) endpoint for data transmission;

after the USB host sends the interface selecting command and selects a non-data transmission interface, the USB audio device stops the SOF interruption of the USB;

wherein a bandwidth needed for transmitting the audio data through the USB ISO endpoint is reserved on the USB host side;

wherein the enumeration and identification of the USB audio device according to the interface descriptor of the USB audio device comprising:

the USB resets in order that a device address of the USB device is restored to a default address;

the USB host driver requests the device for a device descriptor, and the USB device returns the device descriptor of the USB device to the USB host;

the USB host driver sets an address of the device, the USB host sends a command of setting the address to the device, after receiving the command, the USB device fills the received address to an address register of a USB device controller;

the USB host driver requests the device for a configuration descriptor, the USB host sends a command to the device to request the device for the configuration descriptor, and the USB device returns the configuration descriptor of the USB composite device, including the interface descriptors of the USB audio device and the interface descriptors of other sub-devices in the USB composite device, to the USB host;

the USB host driver parses the configuration descriptor and selects the USB configuration; and the USB host driver loads a sub-device driver, the USB host respectively loads the driving program of each sub-device according to the parsed information of USB sub-devices, the mobile terminal further comprising:

a priority setting module, configured to set a data transmission endpoint of the USB audio device as a high-priority endpoint to enable the USB host to preferentially process a data transmission request from the USB audio device, wherein setting the ISO endpoints for audio transmission requiring a higher real-time property as high- endpoints; and setting the AT port, Modem port, and large-capacity storage device requiring a low real-time Properties as low-priority endpoints, when the transmission interruption of the USB occurs, the data transmission requests of the high-priority endpoints are processed preferentially; and the data transmission requests of other low-priority endpoints are not processed until the data transmission requests on the high-priority endpoints are completely processed, setting an allowable maximal data transmission length of the low-priority endpoint, only the data with a length less than the allowable maximal data transmission length is transmitted on the low-priority endpoint, when the data which the low-priority endpoint requires to transmit with a length longer than the allowable maximal data transmission length, the request is split into multiple small data packets, cancelling the limitation on the allowable maximal data transmission length of the low-priority endpoint, when data transmissions on all the high-priority endpoints have been stopped.

8. The mobile terminal according to claim 7, wherein the interface descriptor of the USB audio device further comprises:

an audio control interface descriptor, an uplink audio data stream interface descriptor, and a downlink audio data stream interface descriptor.

9. The mobile terminal according to claim 8, wherein the non-USB audio device comprises at least one of an AT port, a Modem port and a storage device;

wherein the non-USB audio device is any USB sub-device other than a USB audio device.

10. The mobile terminal according to claim 7, further comprising:

a splitting module which is configured to split data which the non-USB audio device requests to transmit exceeding a threshold into multiple data packets.

11. The mobile terminal according to claim 10, wherein the non-USB audio device comprises at least one of an AT port, a Modem port and a storage device;

wherein the non-USB audio device is any USB sub-device other than a USB audio device.

12. The mobile terminal according to claim 7, wherein the non-USB audio device comprises at least one of an AT port, a Modem port and a storage device;

wherein the non-USB audio device is any USB sub-device other than a USB audio device.

* * * * *